United States Patent
Maruyama

[19]

[11] Patent Number: 6,005,896

[45] Date of Patent: Dec. 21, 1999

[54] RADIO DATA COMMUNICATION DEVICE AND RADIO DATA COMMUNICATION METHOD

[75] Inventor: Hidenori Maruyama, Tokyo, Japan

[73] Assignee: NEC Corporation, Japan

[21] Appl. No.: 08/978,858

[22] Filed: Nov. 26, 1997

[30] Foreign Application Priority Data

Nov. 27, 1996 [JP] Japan .................................. 8-315855

[51] Int. Cl.[6] .......................... H04L 27/04; H04L 27/06; H03D 3/00; H03C 3/00
[52] U.S. Cl. ......................... 375/295; 375/316; 329/316; 332/119
[58] Field of Search .................................. 375/295, 316; 329/316, 348; 332/119, 151

[56] References Cited

U.S. PATENT DOCUMENTS 5,283,531  2/1994  Serizawa et al. ................. 329/316
5,745,005  4/1998  Natsumi ................................ 329/311

FOREIGN PATENT DOCUMENTS 4-150440  5/1992  Japan ............................. H04L 27/02

*Primary Examiner*—Stephen Chin
*Assistant Examiner*—Albert Park
*Attorney, Agent, or Firm*—Ostrolenk, Faber, Gerb & Soffen, LLP

[57] ABSTRACT

A radio data communication device that can perform a packet communication with the packet configuration suitable for transmission of a large volume of data in packet communications utilizing a low rate transmission mode and a high rate transmission mode. The transmitter side transmits packets only in a low rate mode or in a high rate mode after transmission in a low rate mode or only in a high rate mode. The receiver side simultaneously demodulates packets in the low rate mode and the high rate mode to detect the synchronous signal for each mode and judges whether or not in which mode the data has been transmitted, thus selecting the successive receive mode.

27 Claims, 3 Drawing Sheets

RADIO DATA COMMUNICATION DEVICE AND RADIO DATA COMMUNICATION METHOD

BACKGROUND OF THE INVENTION

The present invention relates to a radio packet data communication device suitable in use for radio local area networks (LANs) and to a radio data communication method.

In most conventional communication systems, the modulation mode and the transmission rate are not changed from beginning to end during packet data communications via radio. However, in some communication systems, the modulation mode and the transmission rate are changed, if necessary, during communications. Such systems have a slow rate transmission mode (hereinafter referred to as a low rate mode) and a fast rate transmission mode (hereinafter referred to as a high rate mode). Communications are done using both packets each which is first transmitted in a low rate mode and then transmitted or received in a high rate mode and packets each which is transmitted or received in a low rate mode from beginning to end.

As an example of conventional data communications including a low rate mode and a high rate mode, there is radio data communication in which various flag signals and control signals are certainly transmitted in the low rate mode, and then communications are established using packets for transmitting information data in the high rate mode and packets for transmitting only an ACK (ACKnowledgement) signal in the low rate mode. FIG. 4 is a diagram showing the configuration of a packet for a mode selection in the conventional radio data communications. In the packet, the leading portion in a low rate mode is a preamble portion (training period) while the leading portion in a high rate mode is a preamble portion (training period). In the preamble portion, information data portion is demodulated after the carrier detection and synchronous detection.

The conventional radio data communication system always begins to communicate in the low rate mode. If the rate mode type is not notified in advance to the receiving side, the system cannot ensure communications only in the high rate mode. When communication for a large volume of information data such as VOD (video-on-demand) is desired after establishment of communication protocols, the operation of changing the low rate mode to the high rate mode must be repeated for each packet. This results in the system operation with poor efficiency.

As an another example, JA-P-150440/1992 discloses a radio data transmission system in which the transmission rate is selected. In this radio data transmission system used for the MCA (Multi-Channel Access) business activity radio or the like, a link establishment signal is simultaneously subjected to a MSK (Minimum Shift Keying) demodulation and an AM-MSK (AM-Minimum Shift Keying) demodulation. Thereafter, the data transmission mode upon transmission with the data format for MSK modulation or AM-MSK modulation is selected based on the detection condition of the frame synchronous signal of the link establishment signal in each of the MSK demodulation and the AM-MSK demodulation. Thus the current transmission rate is selected by transmitting the link acknowledgment signal with the selected format.

In the AM-MSK modulation corresponding to a high rate mode, demodulation is performed 2 bits by 2 bits. That is, one bit is used for the AM-demodulation while one bit is used for the MSK demodulation. Hence, since the bit rate is twice that of the MSK modulation corresponding to the low rate mode, the transmission efficiency is poor. Moreover, when the modulation mode is changed, the link must be established every time. Hence, this means that the data communication device in which a low rate mode and a high rate mode are selected in packet units has a poor transmission efficiency.

SUMMARY OF THE INVENTION

The objective of the present invention is to solve the above-mentioned tasks.

Moreover, the objective of the invention is to provide a data communication device in which the modulation mode and the transmission rate can be changed in packet units during communications.

Furthermore, another objective of the present invention is to provide a data communication method by which the modulation mode and the transmission rate can be changed in packet units during communications.

The objective of the present invention is achieved by a radio data communication device connected to a digital signal source for packet data communications, comprising first modulating means for modulating in a first modulation mode predetermined, second modulating means for modulating in a second modulation mode predetermined of which the transmission rate is higher than that of the first modulation mode, and mode deciding means for receiving a transmission signal from the signal source and then handing the transmission signal to the first or second modulating means based on a predetermined criterion, wherein a first packet modulated by the first modulation mode only and a second packet modulated by the second modulation mode only are transmitted.

According to the radio data communication device of the present invention, a third packet formed of a first transmission signal modulated in the first modulation mode and a second transmission signal modulated in the second modulation mode which is subsequent to the first transmission signal is transmitted.

According to the radio data communication device of the present invention, the mode deciding means comprises means for halting the operation of the first or second modulating means which does not hand over a transmission signal.

Furthermore, according to the present invention, a radio data communication device connected to an information processing device for packet data communications, comprises carrier detecting means for detecting a carrier of a receive signal, first demodulating means for demodulating a receive signal modulated in a first modulation mode predetermined, first synchronous detecting means for synchronous detecting a signal demodulated by the first demodulating means, second demodulating means for demodulating a receive signal in a second modulation mode predetermined of which the transmission rate is higher than that of the first modulation mode, second synchronous detecting means for synchronous detecting a signal demodulated by the second demodulating means, and mode deciding means for deciding whether or not the receive signal has been modulated by the first modulation mode or the second modulation mode, based on the two synchronous results of the first and second synchronous detecting means, and then reporting the decision result to the information processing device, wherein a first packet modulated by the first modulation mode only and a second packet modulated by the second modulation mode only are received.

According to the radio data communication device of the present invention, a third packet formed of a first signal modulated in the first modulation mode and a second signal modulated in the second modulating mode which is subsequent to the first signal is received.

According to the radio communication device of the present invention, the mode deciding means includes means for halting the operation of demodulating means and synchronous detecting means which does not correspond to a demodulation mode decided by the mode deciding means, among the first demodulating means, the first demodulating means, the first synchronous detecting means, and the second synchronous detecting means.

Moreover, according to the present invention, a radio data communication device connected to a signal source for generating digital signals and an information processing device for processing digital signals, comprises first modulating means for modulating in a first modulation mode predetermined, second modulating means for modulating in a second modulation mode predetermined of which the transmission rate is higher than that of the first modulation mode, mode deciding means for receiving a transmission signal from the signal source and then handing the transmission signal to the first or second modulating means based on a predetermined criterion, and halting the operation of one which does not hand the transmission signal, among the first modulating means and the second modulating means, carrier detecting means for detecting a carrier of a receive signal, first demodulating means for demodulating a receive signal modulated in a first modulation mode, first synchronous detecting means for synchronous detecting a signal demodulated by the first demodulating means, second demodulating means for demodulating a receive signal in a second modulation mode, second synchronous detecting means for synchronous detecting a signal demodulated by the second demodulating means, and mode deciding means for deciding whether or not the receive signal has been modulated by the first modulation mode or the second modulation mode, based on the two synchronous results of the first and second synchronous detecting means and then reporting the decision result to the information processing device, and for halting the operation of demodulating means and synchronous detecting means which do not correspond to a demodulation system decided by the mode deciding means, among the first demodulating means, the second demodulating means, the first synchronous detecting means, and the second synchronous detecting means, wherein a first packet modulated by the first modulation mode only and a second packet modulated by the second modulation mode only are transmitted and received, wherein a third packet is transmitted and received which is formed of a first signal modulated in the first modulation mode and a second signal modulated in the second modulation mode which is subsequent to the first signal.

According to the radio data communication device of any one of the present invention, the first modulation mode comprises a FSK (Frequency Shift Keying), and the second modulation mode comprises a GMSK (Gaussian Minimum Shift Keying).

According to the radio data communication device of according to the present invention, the first modulation mode comprises a BPSK (Binary Phase Shift Keying), and the second modulation mode comprises a QPSK (Quadrature Phase Shift Keying).

Furthermore, according to the present invention, a radio data communication method for packet data communications, comprises the steps of modulating in a first modulation mode predetermined, modulating in a second modulation mode predetermined of which the transmission rate is higher than that of the first modulation mode, and receiving a transmission signal from a signal source and then handing the transmission signal to modulating means based on a predetermined criterion, wherein a first packet modulated by the first modulation mode only and a second packet modulated by the second modulation mode only are transmitted.

According to the present invention, a radio data communication method for packet data communications, comprises the steps of detecting a carrier of a receive signal, demodulating a receive signal modulated in a first modulation mode predetermined, synchronous detecting a first demodulated signal, demodulating a receive signal in a second modulation mode predetermined of which the transmission rate is higher than that of the first modulation mode, synchronous detecting a second demodulated signal, and deciding whether or not the receive signal has been modulated by the first modulation mode or the second modulation mode, based on synchronous results, and then reporting the decision result to an information processing device, wherein a first packet modulated by the first modulation mode only and a second packet modulated by the second modulation mode only are received.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS (1) Configuration of Transmitter Section

Next, an embodiment of the present invention will be described below with reference to the attached drawings.

Figure 1:
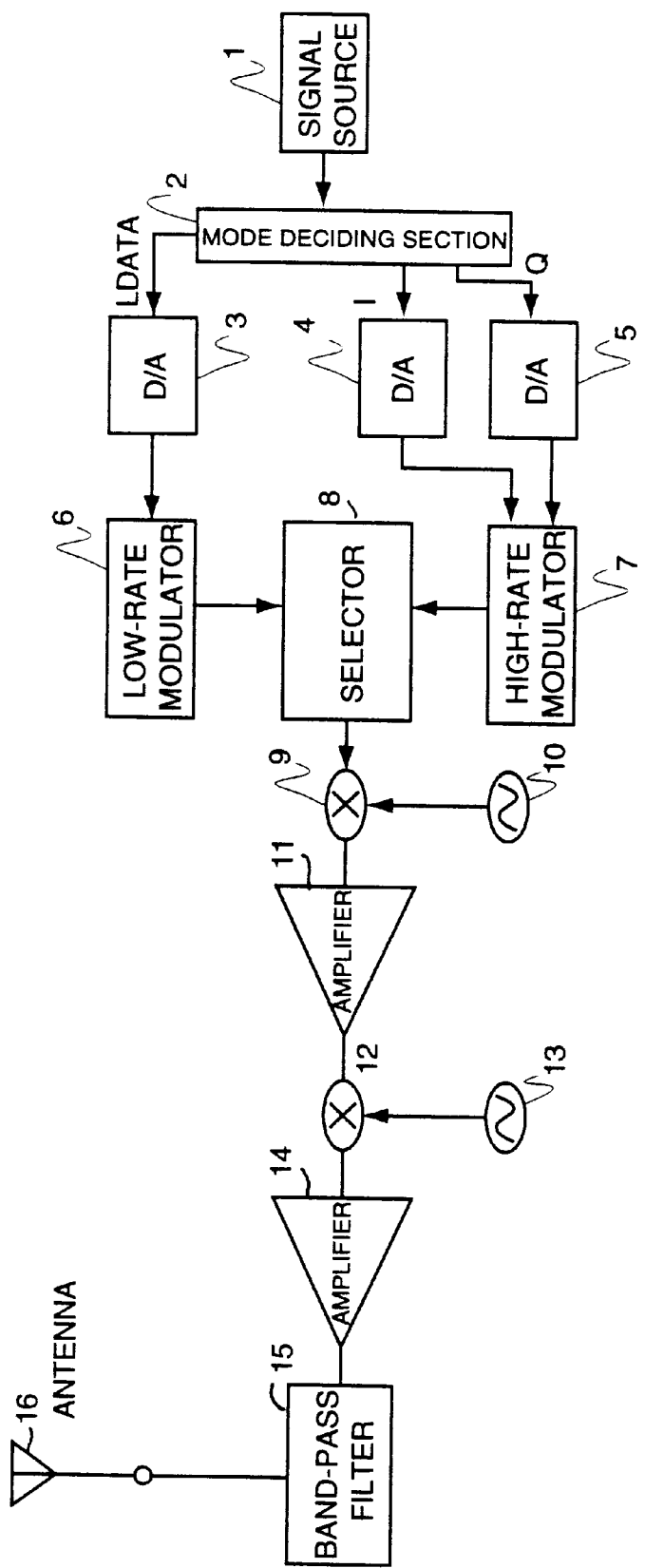
FIG. 1 is a block diagram showing the transmitter of a radio data communication device according to an embodiment of the present invention.

FIG. 1 is a block diagram showing the configuration of a radio data communication device according to an embodiment of the present invention. In the present embodiment, data in a low mode is modulated by the FSK (Frequency Shift Keying) while data in the high mode is modulated by the GMSK (Gaussian Minimum Shift Keying).

The signal source 1 generates digital signals to be transmitted. The mode deciding section 2 decides to modulate a digital signal in a low rate mode or a high rate mode. The D/A (Digital to Analog) converter 3 converts a signal modulated in a low rate mode in the form of an analog signal. The D/A converters 4 and 5 convert a signal modulated in a high rate mode in the form of a digital signal. The low-rate modulator 6 performs a FSK modulation. The high rate modulator 7 performs a GMSK modulation. The selector 8 selects the signal from the low rate modulator 6 or the high rate modulator 7 modulated in the operation mode decided by the mode deciding section 2 and then outputs it to the mixer 9. The mixer 9 boosts the frequency of the received signal to an intermediate frequency. The oscillator 10 generates a signal of a frequency necessary for the mixer 9. The amplifier 11 amplifies the signal from the mixer 9 to a desired level. The mixer 12 boosts the frequency of the received signal to a radio frequency. The oscillator 13 generates a signal of a frequency necessary for the mixer 12. The amplifier 14 amplifies the signal from the mixer 12 to a desired level. The band-pass filter 15 extracts a signal component within a desired band. The antenna 16 radiates radio waves.

(2) Configuration of Receiver Section

Figure 2:
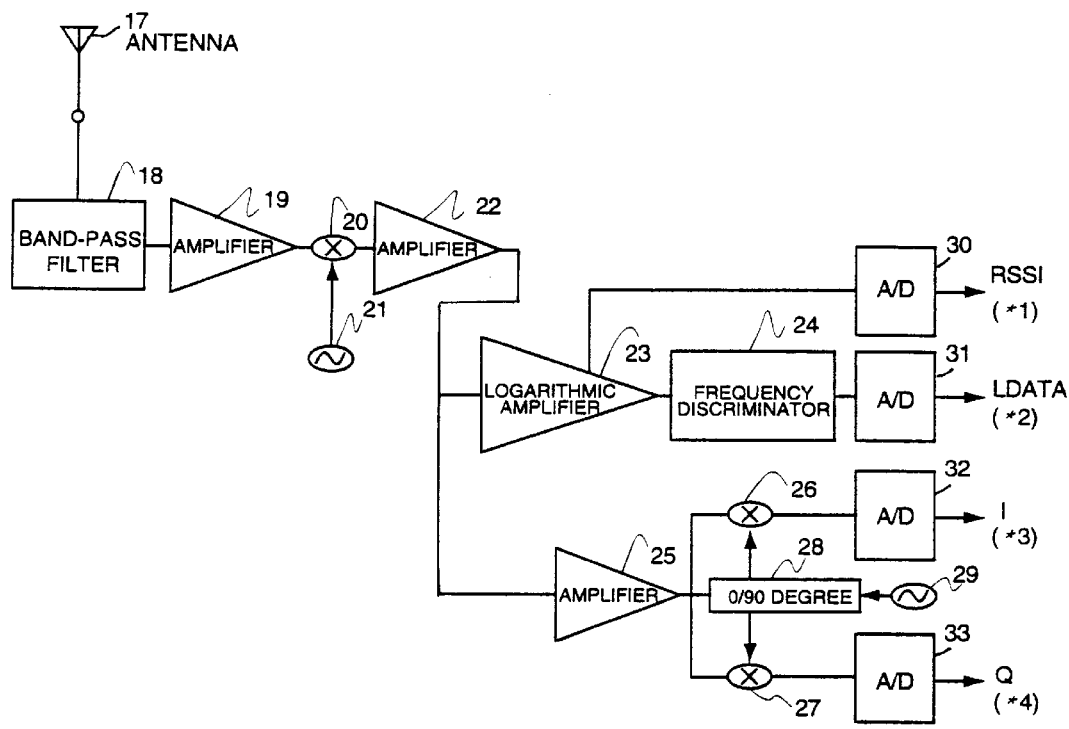
FIG. 2 is a block diagram showing the receiver of a radio data communication device according to an embodiment of the present invention.
Figure 2:
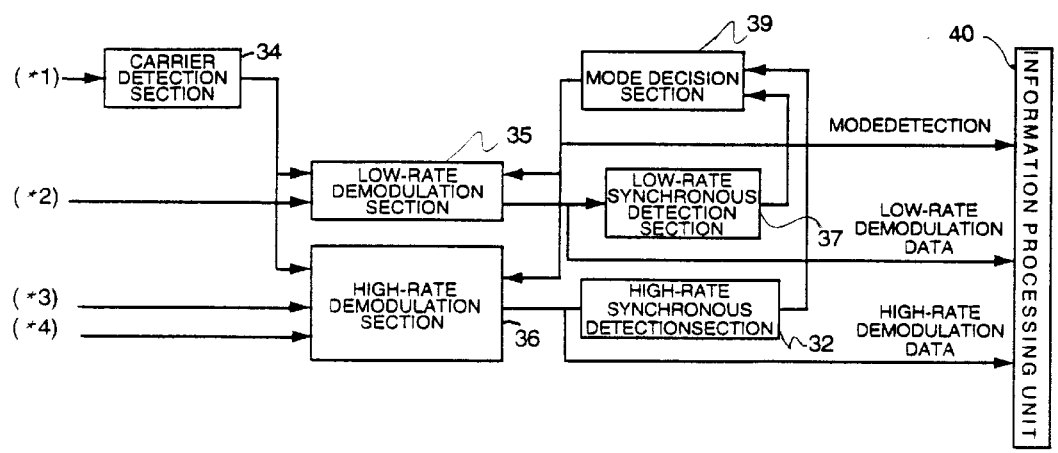

FIG. 2 is a block diagram showing the receiver section of a radio data transmission device according to the present invention. Like the first embodiment, data in a low rate mode is modulated under the FSK operation. Data in a high rate mode is modulated under the GMSK operation.

The antenna 17 receives radio waves transmitted from the radio data communication device including the transmitter section of the first embodiment. The band-pass filter 18 extracts a signal component within a desired band from the received signal. The amplifier 19 amplifies the signal from the band-pass filter 18 to a desired level. The mixer 20 decreases the frequency of the signal from the amplifier 19 to a desired value. The oscillator 21 generates a continuous signal of a desired frequency for the mixer 20. The amplifier 22 amplifies the signal from the mixer 20 amplifies to a desired level. The logarithmic amplifier 23 outputs a limit output signal for carrier detection, receive level detection, and FSk demodulation. The frequency discriminator 24 detects a signal contained in a modulated carrier. The amplifier 25 further amplifies the signal from the amplifier 22 for the GMSK demodulation. The orthogonal demodulation is carried out by means of the combination of the mixers 26 and 27, the 0/90° phase shifter 28 and the oscillator 29. The A/D converter 30 converts a receive level signal output from the logarithmic amplifier 23 into an analog signal. The A/D converter 32 converts an I signal orthogonally demodulated into a digital signal. The A/D converter 33 converts a Q signal orthogonally demodulated into a digital signal. The carrier detector 34 detects a carrier signal based on the output signal from the A/D converter 30. The low rate demodulator 35 performs the low rate demodulation (FSK demodulation) based on the output signal from the A/D converter 31. The high rate demodulator 36 performs the high rate modulation (GMSK) based on the I signal from the A/D converter 32 and the Q signal from the A/D converter 33. The low rate synchronous detector 37 performs the synchronous detection in a low rate mode based on the signal demodulated by the low rate demodulator 35. The high rate synchronous detector 38 performs the synchronous detection in a high rate mode based on the signal demodulated by the high rate demodulator 36. The mode deciding section 39 decides whether or not each packet received in a low rate mode is one transmitted in a low rate mode or one which is first transmitted in a low rate mode and then transmitted in a high rate mode in the middle of the transmission.

(3) Communications by the Radio Data Communication Device of the Present Invention Next, operations of the transmitter in FIG. 1 and the receiver in FIG. 2 will be described in communications between the radio data transmission devices according to the present invention.

The mode deciding section 2 receives a signal from the signal generator 1 and then decides the operation mode based on the type and amount of the receive signal. For example, the mode deciding section 2 selects a low rate mode when an ACK signal only is transmitted. The mode deciding section 2 selects a high rate mode when a large volume of information data is transmitted after establishment of mutual communication protocols. Moreover when information data is transmitted after transmission of various flag signals and control signals, the mode deciding section 2 transmits the flag signals and control signals in a low rate mode and then transmits the information data in a high rate mode.

After deciding an operation mode, the mode deciding section 2 hands over a signal to be transmitted in a low rate mode to the low rate modulator 6 via the D/A converter 3. The mode deciding section 2 also hands over a signal to be transmitted in a high rate mode to the high rate modulator 7 via the D/A converters 4 and 5. The mode deciding section 2 can minimize the power consumption by halting the operation of the modulator which does not correspond to the decided operation mode. That is, the operation of the high rate modulator 7 is ceased in a low rate mode while the operation of the low rate modulator 6 is ceased in a high rate mode.

The frequency of the signal modulated by the low rate modulator 6 or the high rate modulator 7 is boosted to a radio frequency by means of the mixers 9 and 12, the amplifiers 11 and 14, and the band-pass filter 15. Then the boosted frequency signal is transmitted from the antenna 16.

The antenna 17 receives a radio frequency signal. The received signal is variously processed via the band-pass filter 18, the amplifier 19, the mixer 20, and the amplifier 22. Then, the resultant signal reaches the logarithmic amplifier 23 and the amplifier 25. The logarithmic amplifier 23 sends the signal from its output terminal to the carrier detector 34 via the A/D converter 30 without any change. The logarithmic amplifier 23 sends the converted signal from its other output terminal to the low rate demodulator 35 via the frequency discriminator 24 and the A/D converter 31. The amplifier 25 amplifies the signal. Then, the orthogonal modulation section formed of the mixers 26 and 27, the 0/90° phase shifter 28 and the oscillator 29 orthogonally demodulates the amplified signal. Thereafter, two resultant demodulated signals are input respectively to the high rate demodulator via the A/D converters 32 and 33.

Figure 3:
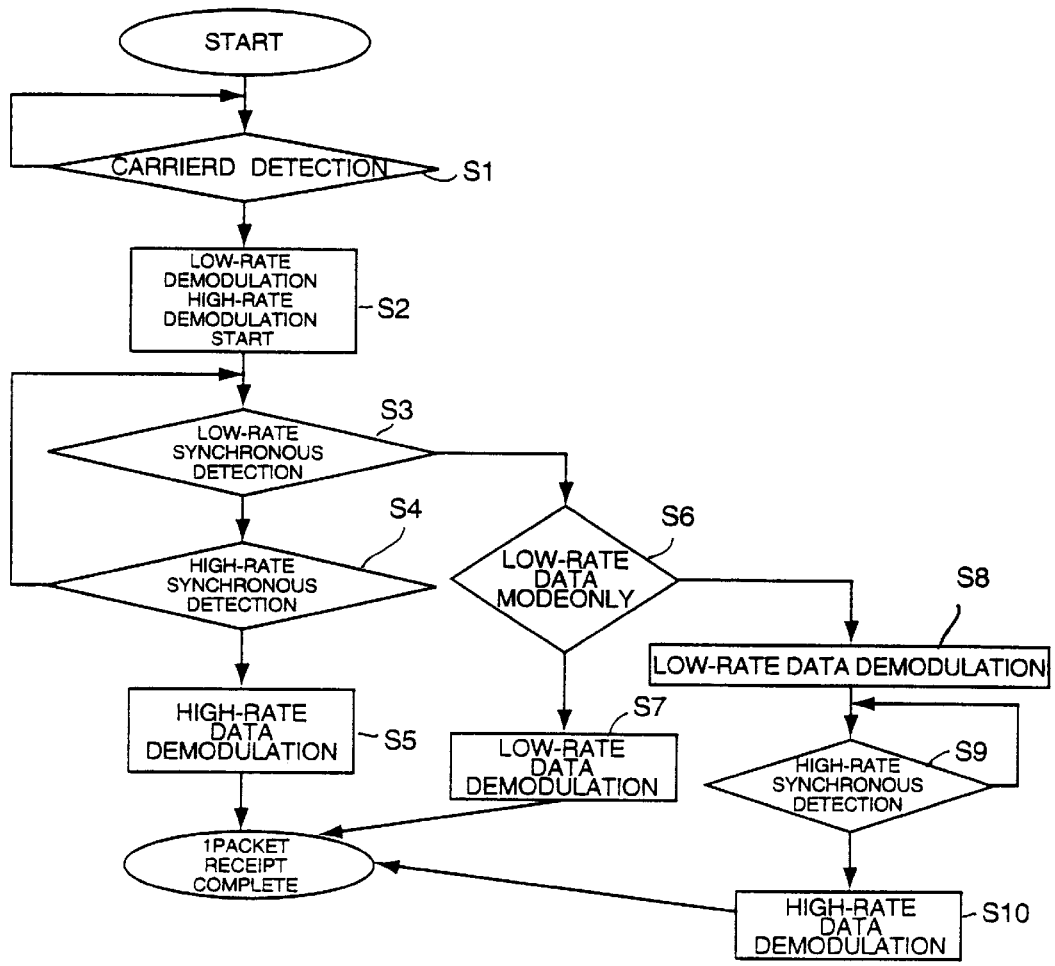
FIG. 3 is a flowchart showing a one-packet receiving operation of the receiver according to an embodiment of the present invention.
Figure 4:
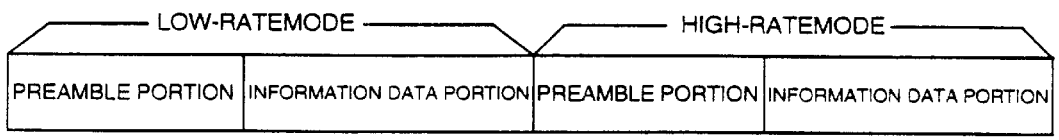
FIG. 4 is a diagram showing a packet configuration in a conventional radio data communication device.

Successively, the operation of the rear stage of the receiver in FIG. 2 will be described with reference to FIG. 3. FIG. 3 is a flowchart showing one packet receive operation in the receiver according to the present embodiment.

The carrier detector 34 detects the beginning of reception when the level of the input signal exceeds a predetermined threshold value (step S1). Demodulation starts by concurrently operating the low rate demodulator 35 and the high rate demodulator 36 (Step 2). Successively, synchronous detection is performed by means of the low rate synchronous detector 37 and the high rate synchronous detector 38. The mode deciding section 39 decides the operation mode of the transmitted signal based on the detection result (Step S3).

When the synchronous detection is not performed by the low rate synchronous detector 37, but performed by the high rate synchronous detector 38 (Step 4), the low rate demodulator 35 and the low rate synchronous detector 37, which are not needed for the high rate mode demodulation, are ceased in operation. Then, the mode deciding section 39 decides that the operation mode is a high rate mode and then demodulates the signal for one packet at high rate, then ending its operation (Step 5).

When the low rate synchronous detector 37 synchronously detects a packet, it is judged whether the packet is continuously transmitted only in a low rate mode or the packet is to be switched to a high rate mode on the way (Step 6). If the packet is to be transmitted only in a low rate mode, both the high rate demodulator 36 and the high rate synchronous detector, which are not needed for the demodulation in a low rate mode 38, are halted in operation. Thus, signals for one packet are demodulated in a low rate mode (Step 7) and then the operation is completed. Even when the operation mode is changed to a high rate mode on the way, both the high rate demodulator 36 and the high rate synchronous detector 38 are halted in operation. Then, the signal transmitted in a low rate mode by means of the low rate demodulator 35 and the low rate synchronous detector 37 is demodulated (Step 8). In order to judge whether a packet is being transmitted only in a low rate mode or the operation is to be changed to a high rate mode on the way, a flag showing the presence or absence of a change in operation mode is arranged in the preamble portion of the packet in a low rate mode. The operation mode is judged by referring to the flag.

Thereafter, the high rate demodulator 36 and the high rate synchronous detector 38 resume their operations while the low rate demodulator 35 and the low rate synchronous detector 37 are halted in operation. The high rate synchronous detector 38 performs a synchronous detection in a high rate mode (Step 9) and demodulates the signal transmitted in a high rate mode (Step 10). Then, the operation is completed.

As described above, according to the present invention, since one system can perform data packet communications in which a suitable operation mode is selected in packet units, data can be efficiently transmitted. Thus, applications and needs for the system can be effectively expanded.

The entire disclosure of Japanese Patent Application No. 8-315855 filed on Nov. 27, 1996 including specification, claims, drawing and summary are incorporated herein by reference in its entirety.

What is claimed is:

1. A radio data communication device connected to a digital signal source for packet data communications, comprising:

first modulating means for modulating in a first predetermined modulation mode, second modulating means for modulating in a second predetermined modulation mode of which the transmission rate is higher than that of said first modulation mode, and mode deciding means for receiving a transmission signal from said signal source and then handing said transmission signal to said first or second modulating means based on a predetermined criterion, said mode deciding means comprising means for halting the operation of said first or second modulating means which does not hand over a transmission signal, wherein a first packet modulated by said predetermined modulation mode only and a second packet modulated by said second predetermined modulation mode only are transmitted.

2. The radio data communication device of claim 1, wherein said first modulation mode comprises a FSK (Frequency Shift Keying), and wherein said second modulation mode comprises a GMSK (Gaussian Minimum Shift Keying).

3. The radio data communication device of claim 1, wherein said first modulation mode comprises a BPSK (Binary Phase Shift Keying), and wherein said second modulation mode comprises a QPSK (Quadrature Phase Shift Keying).

4. The radio data communication device of claim 1, wherein said first modulation mode comprises a FSK (Frequency Shift Keying), and wherein said second modulation mode comprises a GMSK (Gaussian Minimum Shift Keying).

5. The radio data communication device of claim 1, wherein said first modulation mode comprises a BPSK (Binary Phase Shift Keying), and wherein said second modulation mode comprises a QPSK (Quadrature Phase Shift Keying).

6. A radio data communication device connected to a digital signal source for packet data communications, comprising:

first modulating means for modulating in a first predetermined modulation mode, second modulating means for modulating in a second predetermined modulation mode of which the transmission rate is higher than that of said first modulation mode, and mode deciding means for receiving a transmission signal from said signal source and then handing said transmission signal to said first or second modulating means based on a predetermined criterion, wherein a first packet modulated by said first modulation mode only, a second packet modulated by said second modulation mode, and a third packet formed of a first transmission signal modulated in said predetermined modulation mode and a second transmission signal modulated in said second predetermined modulation mode which is subsequent to said first transmission signal are transmitted.

7. The radio data communication device of claim 6, wherein said mode deciding means comprises means for halting the operation of said first or second modulating means which does not hand over a transmission signal.

8. The radio data communication device of claim 7, wherein said first modulation mode comprises a FSK (Frequency Shift Keying), and wherein said second modulation mode comprises a GMSK (Gaussian Minimum Shift Keying).

9. The radio data communication device of claim 7, wherein said first modulation mode comprises a BPSK (Binary Phase Shift Keying), and wherein said second modulation mode comprises a QPSK (Quadrature Phase Shift Keying).

10. The radio data communication device of claim 7, wherein said first modulation mode comprises a BPSK (Binary Phase Shift Keying), and wherein said second modulation mode comprises a QPSK (Quadrature Phase Shift Keying).

11. The radio data communication device of claim 6, wherein said first modulation mode comprises a FSK (Frequency Shift Keying), and wherein said second modulation mode comprises a GMSK (Gaussian Minimum Shift Keying).

12. The radio data communication device of claim 6, wherein said first modulation mode comprises a BPSK (Binary Phase Shift Keying), and wherein said second modulation mode comprises a QPSK (Quadrature Phase Shift Keying).

13. A radio data communication device connected to an information processing device for packet data communications, comprising:

carrier detecting means for detecting a carrier of a receive signal, first demodulating means for demodulating a receive signal modulated in a first predetermined modulation mode, first synchronous detecting means for synchronous detecting a signal demodulated by said first demodulating means, second demodulating means for demodulating a receive signal in a second predetermined modulation mode of which the transmission rate is higher than that of said fist modulation mode, second synchronous detecting means for synchronous detecting a signal demodulated by said second demodulating means, and mode deciding means for deciding whether or not said receive signal has been modulated by said second predetermined modulation mode or said second predetermined modulation mode, based on the two synchronous results of said first and second synchronous detecting means, and then reporting the decision result to said information processing device, said mode deciding means includes means for halting the operation of the demodulating means and the synchronous detecting means which does not correspond to a demodulation mode decided by said mode deciding means, among said first demodulating means, said first demodulating means, said first synchronous detecting means, and said second synchronous detecting means, wherein a first packet modulated by said second predetermined modulation mode only and a second packet modulated by said second predetermined modulation mode only are received.

14. A radio data communication device connected to an information processing device for packet data communications, comprising:

carrier detecting means for detecting a carrier of a receive signal, first demodulating means for demodulating a receive signal modulated in a first predetermined modulation mode, first synchronous detecting means for synchronous detecting a signal demodulated by said first demodulating means, second demodulating means for demodulating a receive signal in a second predetermined modulation mode of which the transmission rate is higher than that of said first modulation mode, second synchronous detecting means for synchronous detecting a signal demodulated by said second demodulating means, and mode deciding means for deciding whether or not said receive signal has been modulated by said first modulation mode or said second modulation mode, based on the two synchronous results of said first and second synchronous detecting means, and then reporting the decision result to said information processing device, wherein a first packet modulated by said first modulation mode only, a second packet modulated by said second modulation mode, and a third packet formed of a first signal modulated in said first predetermined modulation mode and a second signal modulated in said second predetermined modulating mode which is subsequent to said first signal are received.

15. The radio communication device of claim 14, wherein said mode deciding means includes means for halting the operation of demodulating means and synchronous detecting means which does not correspond to a demodulation mode decided by said mode deciding means, among said first demodulating means, said first demodulating means, said first synchronous detecting means, and said second synchronous detecting means.

16. The radio data communication device of claim 15, wherein said first modulation mode comprises a FSK (Frequency Shift Keying), and wherein said second modulation mode comprises a GMSK (Gaussian Minimum Shift Keying).

17. The radio data communication device of claim 15, wherein said first modulation mode comprises a BPSK (Binary Phase Shift Keying), and wherein said second modulation mode comprises a QPSK (Quadrature Phase Shift Keying).

18. The radio data communication device of claim 14, wherein said first modulation mode comprises a FSK (Frequency Shift Keying), and wherein said second modulation mode comprises a GMSK (Gaussian Minimum Shift Keying).

19. The radio data communication device of claim 14, wherein said first modulation mode comprises a BPSK (Binary Phase Shift Keying), and wherein said second modulation mode comprises a QPSK (Quadrature Phase Shift Keying).

20. The radio data communication device of claim 13, wherein said first modulation mode comprises a FSK (Frequency Shift Keying), and wherein said second modulation mode comprises a GMSK (Gaussian Minimum Shift Keying).

21. The radio data communication device of claim 13, wherein said first modulation mode comprises a FSK (Frequency Shift Keying), and wherein said second modulation mode comprises a GMSK (Gaussian Minimum Shift Keying).

22. The radio data communication device of claim 13, wherein said first modulation mode comprises a BPSK (Binary Phase Shift Keying), and wherein said second modulation mode comprises a QPSK (Quadrature Phase Shift Keying).

23. A radio data communication device connected to a signal source for generating digital signals and an information processing device for processing digital signals, comprising:

first modulating means for modulating in a first modulation mode predetermined, second modulating means for modulating in a second modulation mode predetermined of which the transmission rate is higher than that of said first modulation mode, mode deciding means for receiving a transmission signal from said signal source and then handing said transmission signal to said first or second modulating means based on a predetermined criterion, and halting the operation of one which does not hand said transmission signal, among said first modulating means and said second modulating means, carrier detecting means for detecting a carrier of a receive signal, first demodulating means for demodulating a receive signal modulated in a first modulation mode, first synchronous detecting means for synchronous detecting a signal demodulated by said first demodulating means, second demodulating means for demodulating a receive signal in a second modulation mode, second synchronous detecting means for synchronous detecting a signal demodulated by said second demodulating means, and mode deciding means for deciding whether or not said receive signal has been modulated by said first modulation mode or said second modulation mode, based on the two synchronous results of said first and second synchronous detecting means and then reporting the decision result to said information processing device, and for halting the operation of demodulating means and synchronous detecting means which do not correspond to a demodulation system decided by said mode deciding means, among said first demodulating means, said second demodulating means, said first synchronous detecting means, and said second synchronous detecting means, wherein a first packet modulated by said first modulation mode only and a second packet modulated by said second modulation mode only are transmitted and received, wherein a third packet is transmitted and received which is formed of a first signal modulated in said first modulation mode and a second signal modulated in said second modulation mode which is subsequent to said first signal.

24. The radio data communication device of claim 23, wherein said first modulation mode comprises a FSK (Frequency Shift Keying), and wherein said second modulation mode comprises a GMSK (Gaussian Minimum Shift Keying).

25. The radio data communication device of claim 23, wherein said first modulation mode comprises a BPSK (Binary Phase Shift Keying), and wherein said second modulation mode comprises a QPSK (Quadrature Phase Shift Keying).

26. A radio data communication method for packet data communications, comprising the steps of:

modulating in a first predetermined modulation mode, modulating in a second predetermined modulation mode of which the transmission rate is higher than that of said first modulation mode, and receiving a transmission signal form a signal source and then handling said transmission signal to modulating means based on a predetermined criterion, wherein a first packet modulated by said first predetermined modulation mode only, a second packet modulated by said second predetermined modulation mode, and a third packet formed of a first transmission signal modulated in said first modulation mode and a second transmission signal modulated in said second modulation mode which is subsequent to said first transmission signal are transmitted.

27. A radio data communication method for packet data communications, comprising the steps of:

detecting a carrier of a receive signal, demodulating a receive signal modulated in a first modulation mode predetermined, synchronous detecting a first demodulated signal, demodulating a receive signal in a second modulation mode predetermined of which the transmission rate is higher than that of said first modulation mode, synchronous detecting a second demodulated signal, and deciding whether or not said receive signal has been modulated by said first modulation mode or said second modulation mode, based on synchronous results, and then reporting the decision result to an information processing device, wherein a first packet modulated by said first modulation mode only, a second packet modulated by said second modulation mode, and a third packet formed of a first transmission signal modulated in said first modulation mode and a second transmission signal modulated in said second modulation mode which is subsequent to said first transmission signal are transmitted.

* * * * *